(No Model.) 2 Sheets—Sheet 1.

F. R. PACKHAM.
FURROW OPENER FOR SEEDING IMPLEMENTS.

No. 601,477. Patented Mar. 29, 1898.

Witnesses
G. M. Gridley
Jno. S. Green

Inventor
Frank R. Packham
By his Attorney (No Model.) 2 Sheets—Sheet 2.
F. R. PACKHAM.
FURROW OPENER FOR SEEDING IMPLEMENTS.
No. 601,477. Patented Mar. 29, 1898.
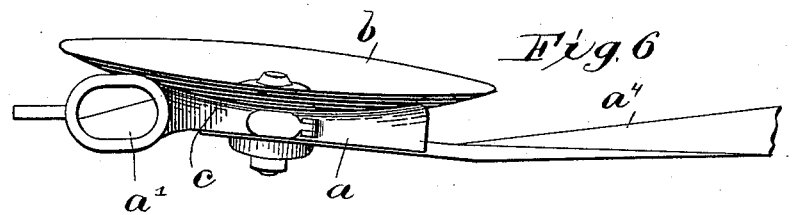
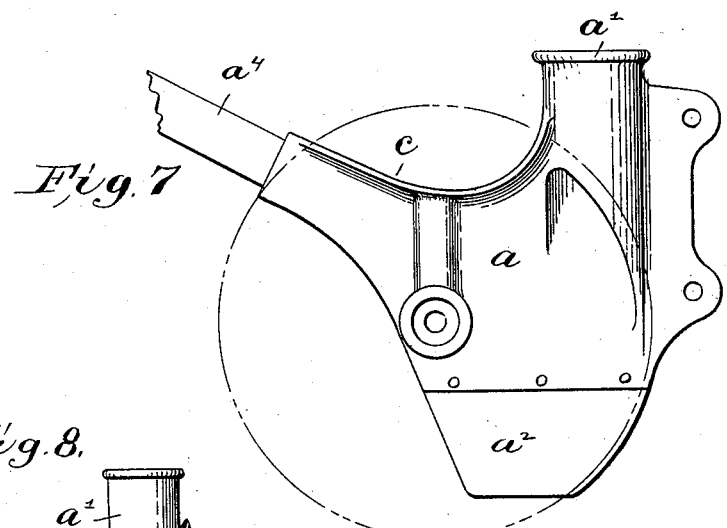
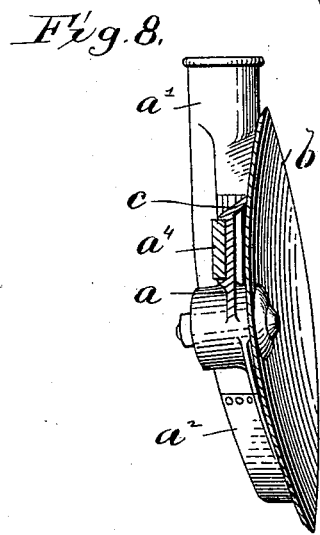

UNITED STATES PATENT OFFICE.

FRANK R. PACKHAM, OF SPRINGFIELD, OHIO, ASSIGNOR TO THE SUPERIOR DRILL COMPANY, OF SAME PLACE.

FURROW-OPENER FOR SEEDING IMPLEMENTS.

SPECIFICATION forming part of Letters Patent No. 601,477, dated March 29, 1898.

Application filed September 13, 1897. Serial No. 651,410. (No model.)

*To all whom it may concern:*

Be it known that I, FRANK R. PACKHAM, a citizen of the United States, residing at Springfield, in the county of Clark and State of Ohio, have invented certain new and useful Improvements in Furrow-Openers for Seeding Implements, of which the following is a specification.

My invention relates to improvements in disk furrow-openers for seeding implements.

It consists in the constructions and combinations of parts hereinafter described, and set forth in the claims.

Figure 1:
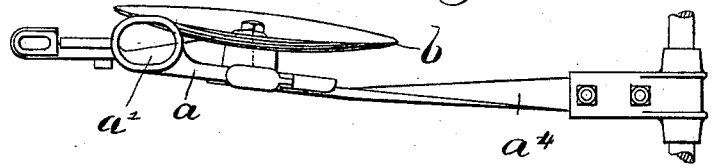
Figure 2:
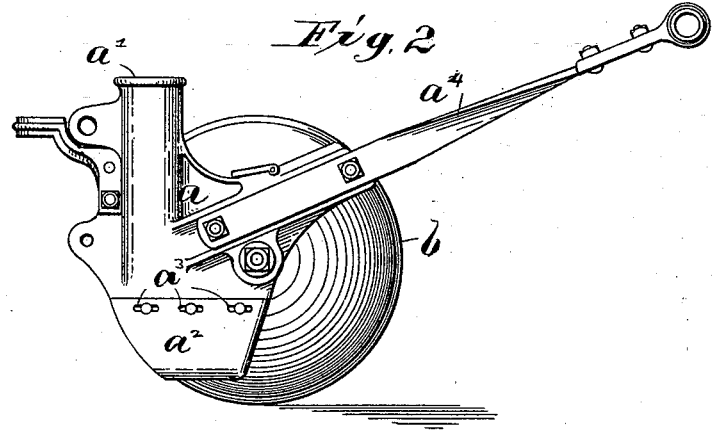
Figure 4:
Figure 3:
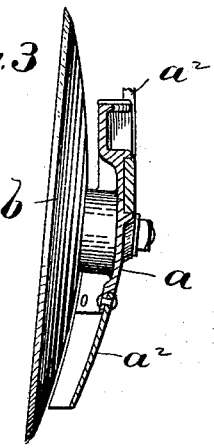
Figure 5:
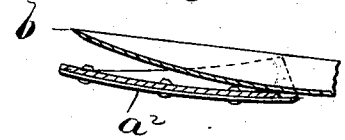

In the accompanying drawings, Figure 1 is a plan view of a device embodying my invention. Fig. 2 is a side elevation of the same. Fig. 3 is a sectional elevation in cross-section. Figs. 4 and 5 are sectional details showing slight modifications. Figs. 6, 7, and 8 are respectively top, side, and sectional elevations showing modifications.

Like parts are represented by similar letters of reference in the several views.

In constructing my improved furrow-opener I employ a frame or support $a$, which supports the furrow-opening disk $b$. The support $a$ also carries a conduit $a'$, which is preferably formed integral therewith. The frame or support $a$ may be connected to the seeding implement by any suitable drag-bar $a^4$, which will be attached in any well-known manner at its forward end to secure the necessary adjustment of the furrow-opening device.

In order that a proper furrow may be formed and the seed properly deposited into the furrow, the disk is journaled onto the support, so that it stands at an angle to the line of forward movement, and the conduit $a'$ is placed behind and on the convex side of the disk, so as to stand within the angle thus formed or immediately above the furrow.

In order that the seed may not only be properly deposited, but also properly covered, I journal the disk at an angle to the horizontal, so that the disk is inclined to the vertical as well as to the line of travel. The result of this construction is that the lower edge of the disk has a tendency to cut under the soil, and by reason of the angular relation to the line of draft it lifts up the soil at the rear and at a point near where the seed is to be deposited.

The conduit $a'$ is formed open on the side next to the disk, so that the moving disk forms one side of the conduit, the other side being made to conform substantially to the side of the disk, so that the seed is directed not only into the furrow, but under the earth cut away by the inclined disk, and the seed is covered to a large extent without the aid of any additional covering devices.

It is desirable in a furrow-opening device of this kind that the lower end of the conduit be protected by an extended shield, as shown at $a^2$, and this shield should conform substantially to the back or convex side of the disk and be adjacent thereto. To provide means for compensating for the wear which might occur to the front edge of the shield by reason of the dirt and other substances passing through, I preferably construct the shield $a^2$ separable from the support or conduit, so that it may be adjusted thereon. In the construction which I have illustrated I have shown the shield having slotted openings $a^3$, the shield being made of thin metal, preferably of steel, and riveted or bolted to the support or conduit. In the present case I have illustrated the shield riveted to the conduit. The slotted openings, however, furnish the means for adjusting the same, which can be accomplished by driving the shield to or from the disk. In order that the shield may be made to approach or recede from the disk, the lower edge or that part of the support to which the shield is attached should be inclined to the disk, as shown in Fig. 4, or formed on the arc of a circle, as shown in Fig. 5. In either case the necessary movement of the shield will be permitted by the slotted openings, the rivets holding the same sufficiently tight to prevent movement except by an unusual action, such as the blow of a hammer. The result will be that if the edge of the shield next to the disk should become worn it may be moved to compensate for the wear. It is obvious that instead of the rivets bolts might be used, in which case they could be loosened or tightened in the adjustment of the shield. I have found, however, in practice that rivets answer quite well, and they are not open to the objection of working loose.

To provide against the clogging of the disks or of the seed by the clods or dirt (which is carried up by the disks) becoming lodged in between the support and disk, I construct a guard $c$ at the top of the support and extending to the conduit, this guard being formed at an angle or inclined away from the disk and curved downwardly from the conduit, the inner edge of the guard being formed to conform to the shape of the disk, so that the guard is inclined away from the disk and away from the conduit, and any dirt which is carried by the disk upwardly or which would have a tendency to drop between the support and disk will be caught by this guard and by reason of the curved inclined form will be discharged away from the disk and away from the conduit. When the support and guard are formed integral, as shown in the drawings, I preferably construct this guard $c$ in the nature of a flange which is cast integral with the support and is joined to the conduit, as shown. It is quite obvious, however, that it might be formed separate and fitted to the support and to the conduit.

Having thus described my invention, I claim—

1. In a furrow-opener consisting of a support, a disk journaled at an angle to the line of draft and also with the plane of the disk at an angle to the vertical, a substantially closed conduit located in the rear of the axis of said disk, said conduit having a moving wall formed by the moving disk, substantially as specified.

2. In a furrow-opener the combination of a rotary disk, a support for said disk, a conduit adjacent to the rear of said disk and carried by said support, the lower edge of said conduit being formed at an angle to the disk, a shield connected to the lower edge of said conduit and lying in the same planes as the edge of said conduit adjacent to said shield and adapted to allow the lateral adjustment of said shield substantially as specified.

3. The combination with the furrow-opening disk and its support, of a conduit arranged to the rear of said disk, a shield connected to said conduit and forming the bottom thereof, the front edge of said shield being adapted to stand adjacent to and substantially conform to the back of said disk, said shield being adjustably connected to said conduit and adapted to move laterally on said conduit substantially as specified.

4. The combination with the frame or support, the disk journaled on said support at an angle to the vertical and also at an angle to the line of draft, a conduit carried by said support at an angle to said disk, a shield forming the lower part of said conduit said shield adapted to be moved laterally on said support so as to bring the front edge to or from said disk substantially as specified.

5. The combination with the frame or support, and a disk journaled to the said support as described, a conduit also connected to and supported by said support, of an inclined guard arranged between said conduit and support and shaped to conform to said disk, substantially as and for the purpose specified.

6. The combination with the rotating disk, of a support and a conduit formed integral therewith, said support having a curved inclined guard connected thereto and to said conduit and shaped to conform to said disk, substantially as and for the purpose specified.

In testimony whereof I have hereunto set my hand this 6th day of September, A. D. 1897.

FRANK R. PACKHAM.

Witnesses:
JNO. I. GREEN,
CHAS. I. WELCH.